(12) United States Patent
Lang et al.

(10) Patent No.: US 6,382,705 B1
(45) Date of Patent: May 7, 2002

(54) VEHICLE INDEPENDENT REAR ACCESS PANEL WITH FOUR BAR HINGE

(75) Inventors: Steven Craig Lang, Columbus; Paul D. Wilkins, Grosse Pointe Farms; Michael E. Bodner, Troy, all of MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/775,198

(22) Filed: Feb. 1, 2001

(51) Int. Cl.[7] ............................................. B60J 10/08
(52) U.S. Cl. .................... 296/146.12; 296/155; 49/248
(58) Field of Search ........................ 296/146.12, 155, 296/146.1, 147, 148, 146.2; 49/153, 210, 298, 212, 211, 254, 217

(56) References Cited

U.S. PATENT DOCUMENTS

| | | | |
|---|---|---|---|
| 3,758,990 A | | 9/1973 | Balanos ........................ 49/153 |
| 4,383,392 A | * | 5/1983 | La Conte ...................... 49/248 |
| 4,561,690 A | * | 12/1985 | Shinjo et al. ................. 296/155 |
| 4,716,623 A | * | 1/1988 | Kinaga et al. .......... 296/146.12 |
| 4,738,003 A | * | 4/1988 | Mori et al. .................... 16/321 |
| 4,945,677 A | | 8/1990 | Kramer ........................ 49/210 |
| 5,398,988 A | * | 3/1995 | DeRees et al. .............. 296/155 |
| 5,435,406 A | * | 7/1995 | Gaffoglio et al. ....... 296/146.12 |
| 5,491,875 A | * | 2/1996 | Siladke et al. ................. 16/346 |
| 5,921,613 A | * | 7/1999 | Breunig et al. ......... 296/146.12 |
| 5,971,470 A | * | 10/1999 | May et al. ............. 296/107.09 |
| 6,030,024 A | * | 2/2000 | Schmidhuber et al. . 296/146.12 |
| 6,141,908 A | * | 11/2000 | Bowen ......................... 49/248 |
| 6,182,952 B1 | * | 2/2001 | Gutierrez ..................... 49/248 |
| 6,183,039 B1 | * | 2/2001 | Kohut et al. ................. 296/155 |
| 6,196,618 B1 | * | 3/2001 | Pietryga et al. ........ 296/146.12 |
| 6,213,535 B1 | * | 4/2001 | Landmesser et al. .. 296/146.12 |
| 6,250,707 B1 | * | 6/2001 | Dintner et al. ......... 296/146.12 |
| 6,267,433 B1 | * | 7/2001 | Bayer et al. ................. 296/121 |

* cited by examiner

Primary Examiner—Ken Patel
(74) Attorney, Agent, or Firm—Laura C. Hargitt

(57) ABSTRACT

A four bar linkage is configured in non parallelogram form as a hinge for pivotally guiding a closure panel in a predetermined opening motion between a closed position closing an access opening and a fully open position longitudinally adjacent one side edge of the opening and generally parallel with a side of a vehicle or compartment body. In the opening motion, one edge of the panel first moves outward to clear a structural body member at one edge of the opening and another edge of the panel first rotates and moves longitudinally away from the opposite side of the opening as the panel pivots outward and then inward to the fully open position. The closure panel may be paired with a conventionally hinged front door of a vehicle to allow both the door and the panel to be independently opened or closed regardless of the position of the other.

12 Claims, 6 Drawing Sheets

VEHICLE INDEPENDENT REAR ACCESS PANEL WITH FOUR BAR HINGE

TECHNICAL FIELD

This invention relates to vehicle bodies and, more particularly, to a body closure panel with a multi link pivoting support four bar linkage or hinge assembly for moving the panel between closed and open positions for easy access to the interior of a vehicle's rear compartment.

BACKGROUND OF THE INVENTION

It is known in the art relating to vehicle body closures to provide various types of hinges, track slides and/or linkages for supporting and controlling the opening and closing motions of a closure panel or door to provide user access to the vehicle interior. In some recent types of trucks and automobiles, center opening front and rear doors or half doors (rear access panels) are being provided which are hinged at front or rear outer edges and open from adjacent inner edges to allow access to front and rear portions of a body interior or passenger compartment. In the past, a center pillar, or "B" pillar, was generally provided to which the inner edges of the doors were latched when in their closed positions. Recently, however, pillarless constructions have been provided in which at least the rear door is latched at top and bottom edges of the access opening and includes a support structure, and the front door is latched to the rear door.

Such center opening pillarless door constructions have provided improved access to the rear compartments of some trucks and traditionally two door (coupe) automobiles. However, these arrangements require opening of the front door first so that the rear door may be opened. To assure this, the rear exterior door handle is generally placed between the doors and is accessible only by opening the front door. When the vehicle is parked beside a wall or another vehicle, access to the rear compartment requires first opening the front door, next opening the rear door while standing beside the open front door and then entering or exiting the rear compartment from or to the space between the doors. The rear door must then be closed to allow exit or entry from or to the front door area and then opened to permit exit or entry of another person from/to the rear compartment. Such access could be more easily provided by a sliding door. However, this would require the addition of external tracks as used in van type vehicles, but which are not suitable for automobiles or truck cabs. Accordingly, an alternative body structure and mechanism allowing easier access to vehicle rear compartments was desired.

SUMMARY OF THE INVENTION

The present invention provides a closure panel pivotably supported by a four bar linkage type hinge or hinge assembly horizontally mounted in a vehicle body or other enclosure for closing an associated access opening. The panel is primarily intended for use in vehicles having a side access opening closable by a pivotable hinged front door and a four bar linkage hinge mounted closure panel according to the invention. The closure panel acts as an independent rear access panel that is openable to a position generally parallel and adjacent to the side of the vehicle to permit ingress to or egress from a rear compartment without requiring opening of the adjacent front door. In the closed position, the closure panel latches to upper and lower edges of the side access opening as well as to the rear of the access opening. The panel has an inner edge extending behind an adjacent outer edge of the front door to allow sealing of the pillarless joint in the closed position while allowing the front door to be swung or pivoted open in a conventional manner without moving the closure panel.

In a broadly defined application for a vehicle, the invention includes a vehicle body having a structural body member defining at least one side edge of a user access opening in one side of the body. A closure panel is provided for closing the access opening and is openable for permitting user access to the vehicle. The panel has longitudinally opposite edges positioned in the closed position with one edge adjacent the structural body member and an opposite edge spaced longitudinally adjacent an opposite side edge of the opening. A four bar hinge assembly is providing having a pair of load arms, each pivotally connected at one end to the structural body member and at another end to the closure panel intermediate the opposite edges.

The hinge assembly is configured for pivotally guiding the panel in a predetermined opening motion between a closed position closing the access opening and a fully open position longitudinally adjacent the one side edge of the opening and generally parallel with the side of the body. The opening motion includes varying the angular orientation of the panel while pivoting the panel in a generally longitudinal direction through major and minor arcs such that the one edge of the panel first moves outward to clear the structural body member at the one side edge of the opening and the other edge of the panel first rotates and moves longitudinally away from the opposite side edge of the opening as the panel first pivots outward and then inward to the fully open position.

These and other features and advantages of the invention will be more fully understood from the following description of certain specific embodiments of the invention taken together with the accompanying drawings.

DESCRIPTION OF THE PREFERRED EMBODIMENT

Figure 1:
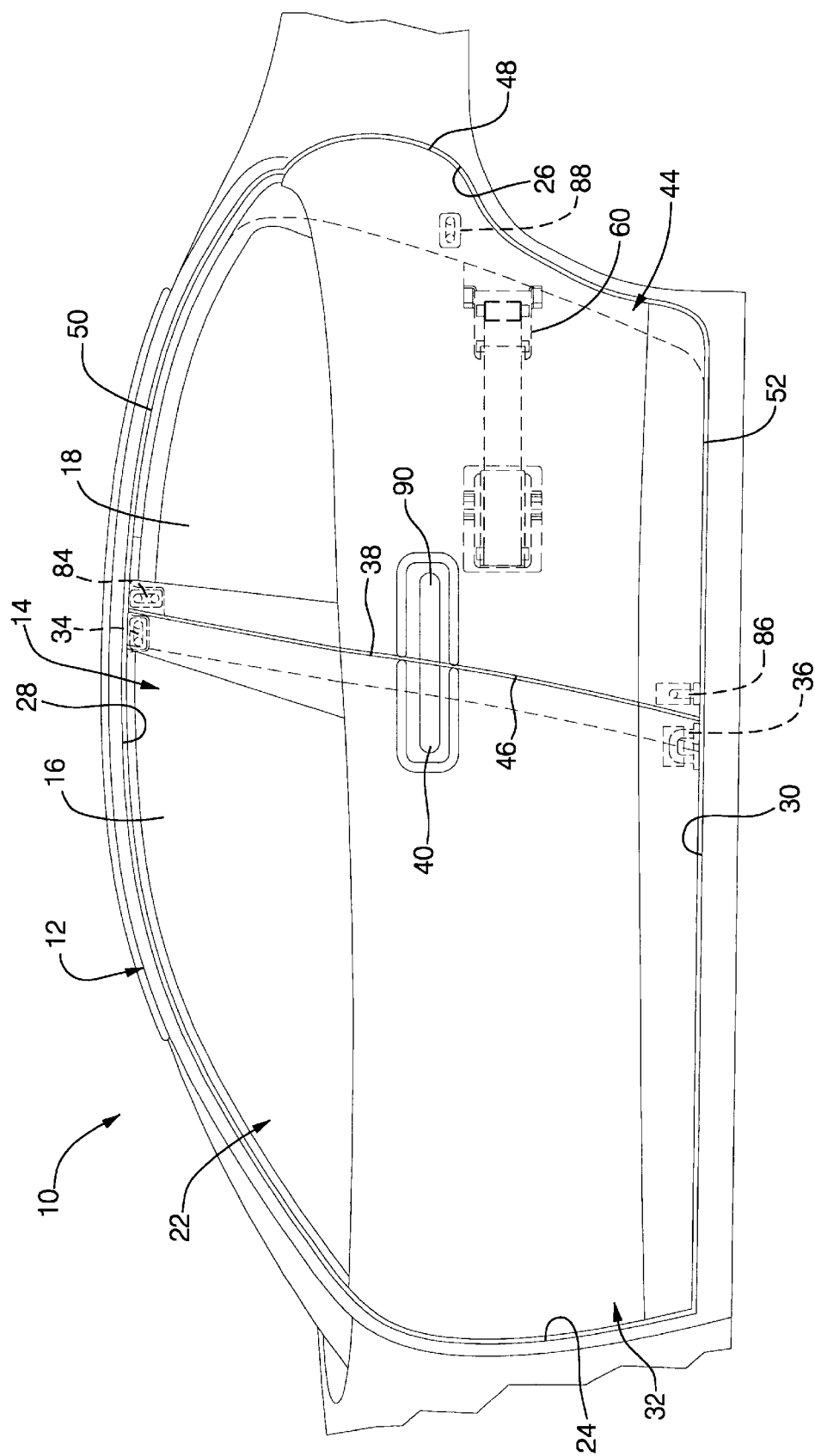
FIG. 1 is partial side view of a vehicle body having a left side rear access panel with a four bar linkage hinge assembly according to the invention shown in the closed position.
Figure 2:
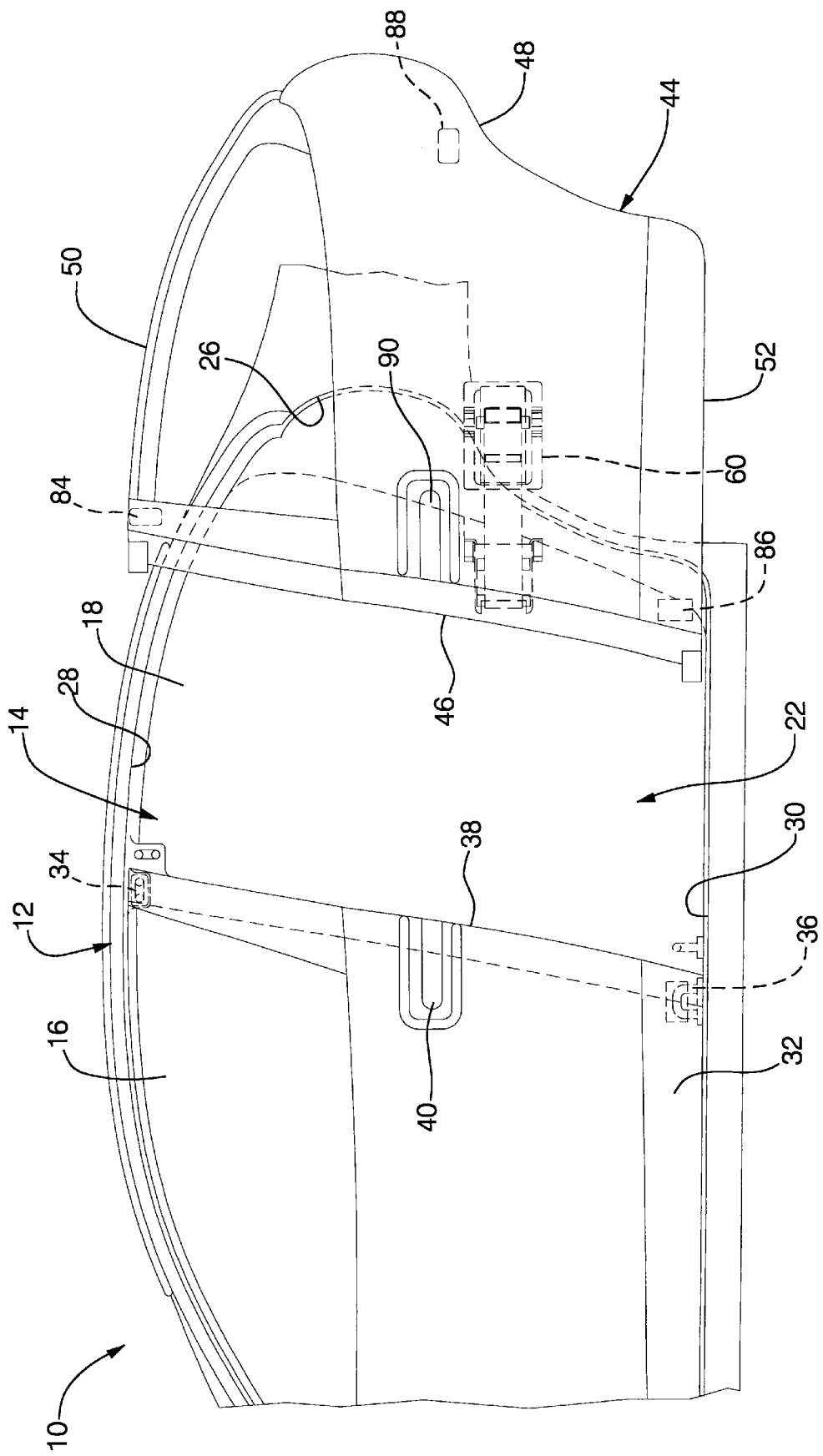
FIG. 2 is a view similar to FIG. 1 showing the rear access panel in the fully open position.
Figure 3:
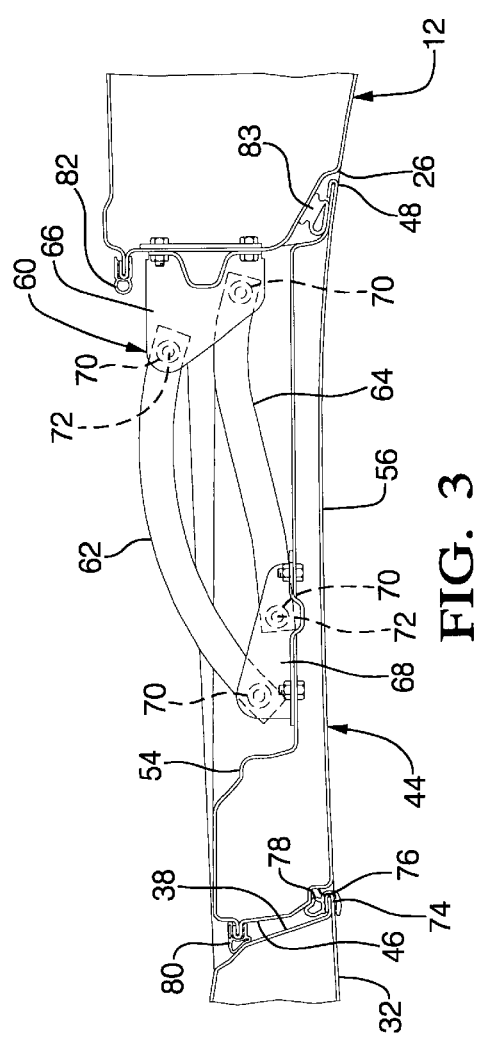
FIG. 3 is a downward cross-sectional view of the body mounted panel and four bar linkage hinge assembly in the closed position.
Figure 4:
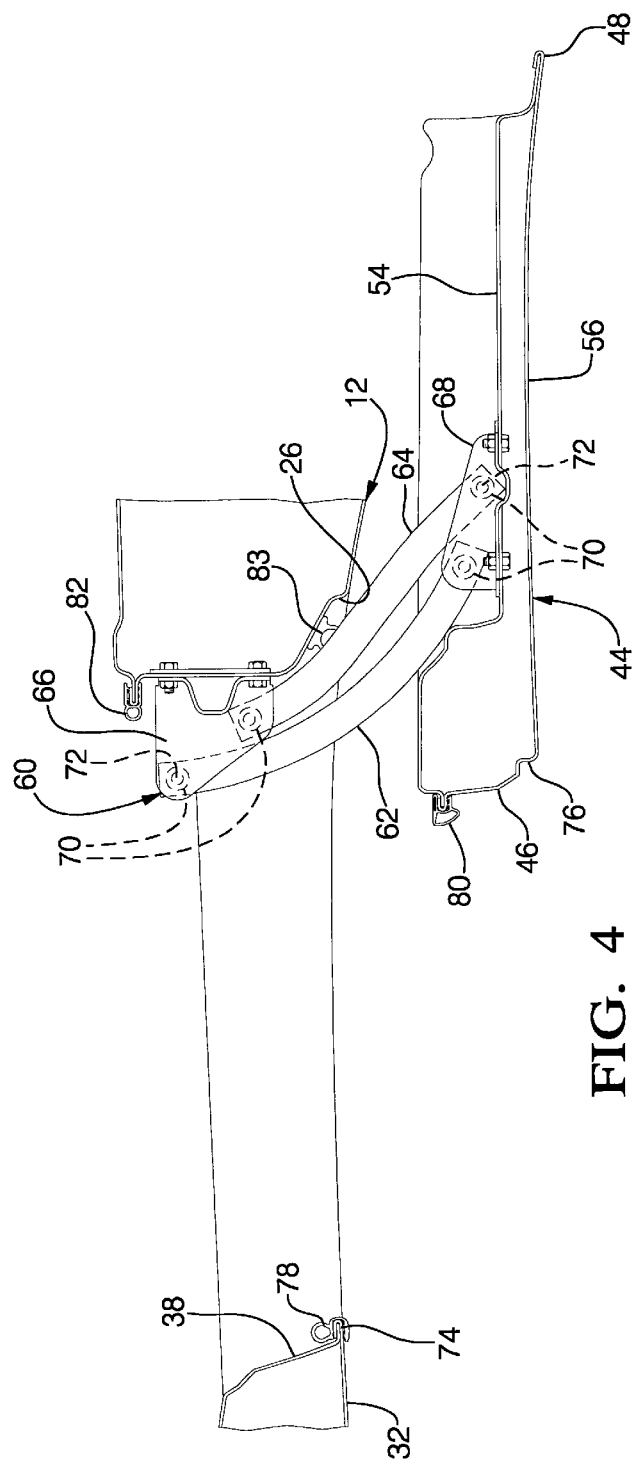
FIG. 4 is a view similar to FIG. 3 with the panel in the fully open position.
Figure 5A:
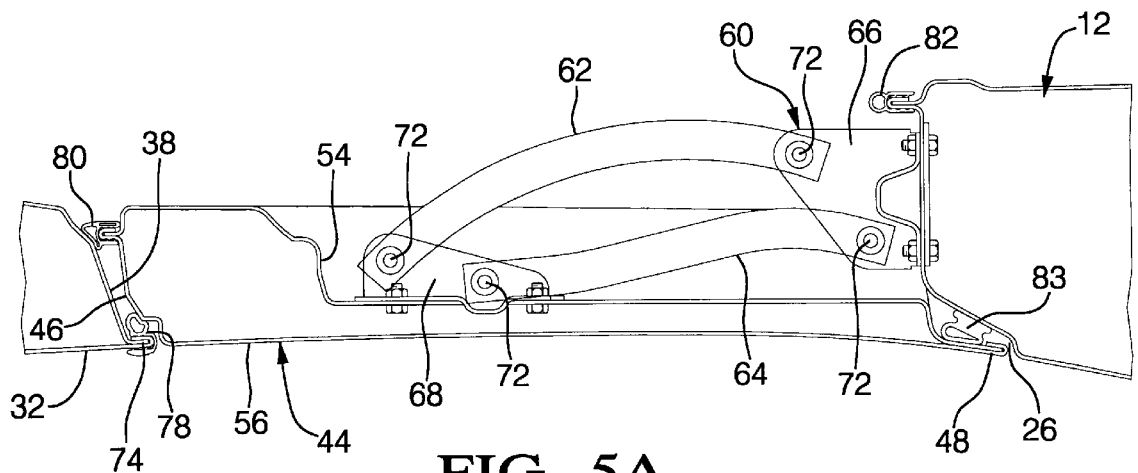
FIGS. 5A–5F are downward cross-sectional views showing progressive positions of the panel from the closed position to the fully open position.
Figure 5B:
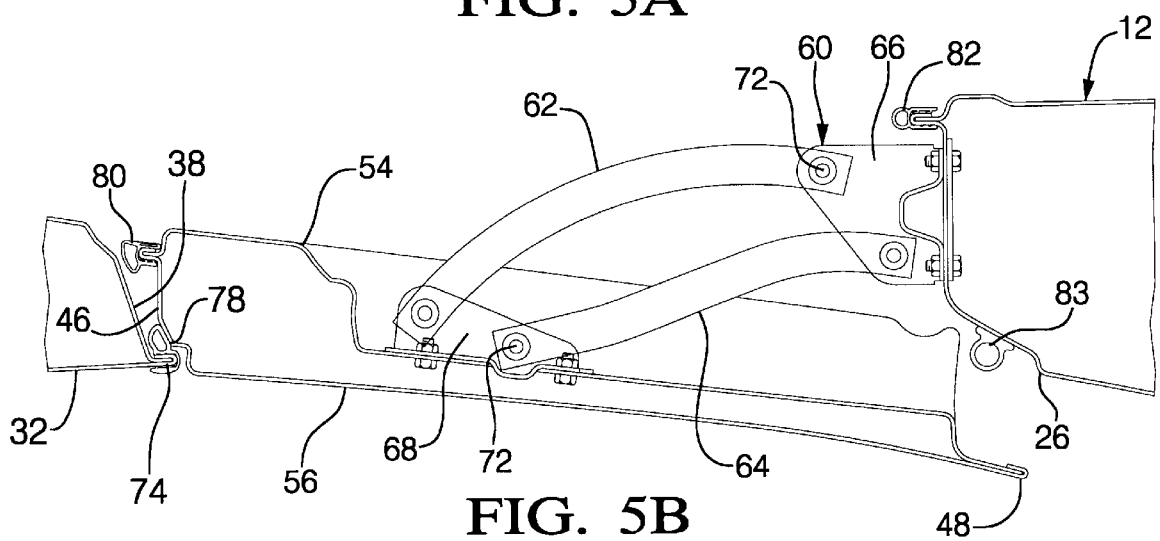
Figure 5C:
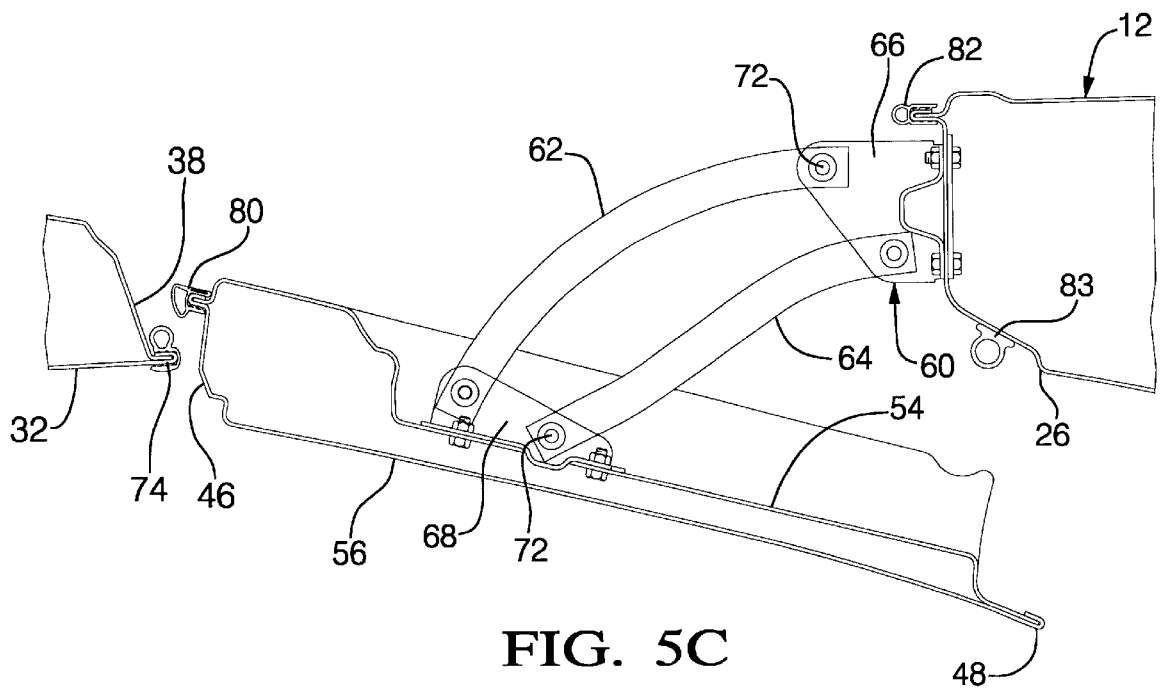
Figure 5D:
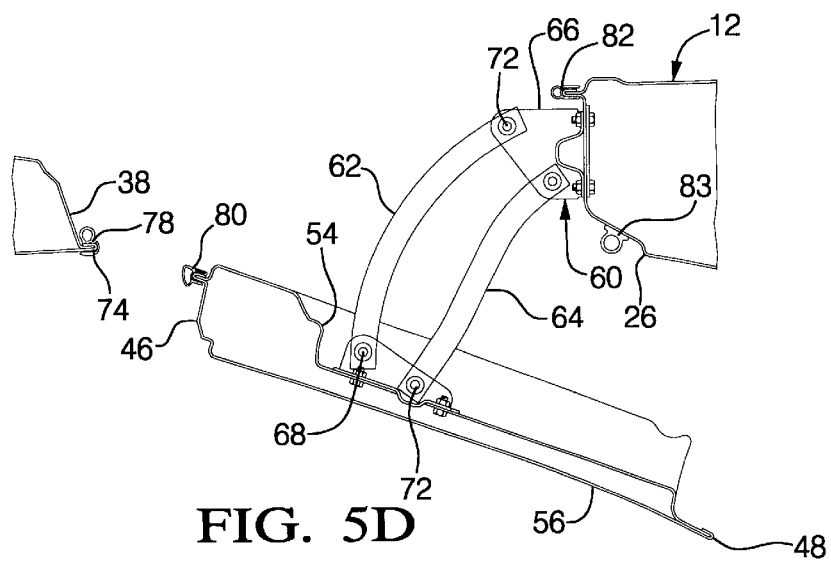
Figure 5E:
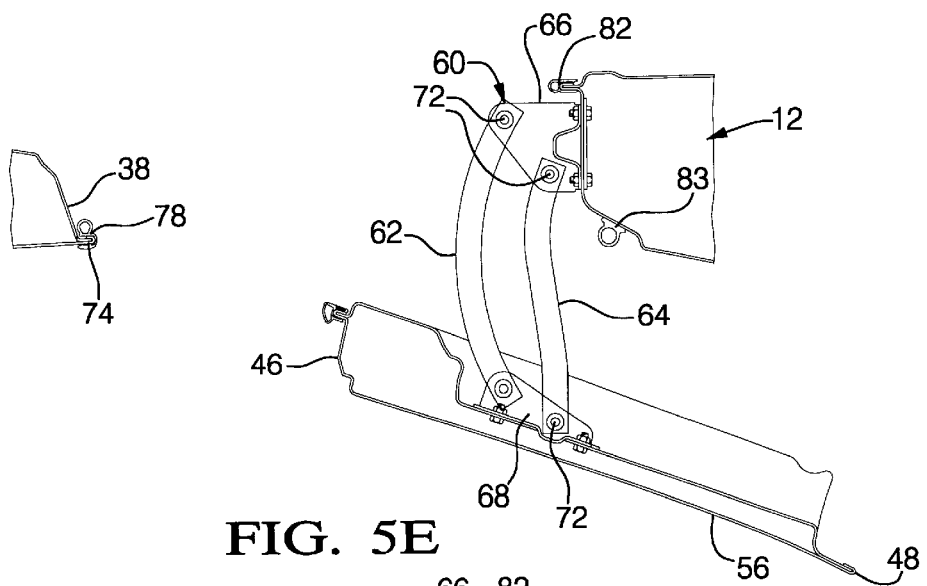
Figure 5F:
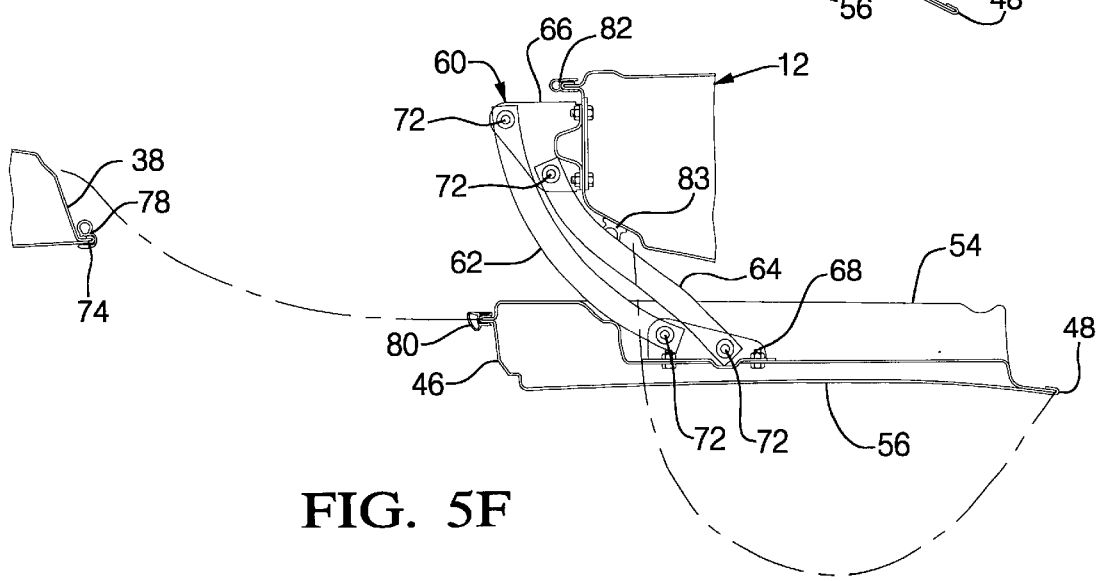

Referring now to the drawings in detail, numeral 10 generally indicates a vehicle having a body 12 with an enclosed compartment 14 including front 16 and rear 18 sections. The front and rear sections may each include passenger seats, but could be configured for cargo or for optional cargo or passenger carrying use if desired. Both compartments are accessed through access openings 22 in the body, one on either side and open to both compartments without a center pillar between the sections. Each opening 22 has a front 24, rear 26, upper 28 and lower 30 edge. Each of the edges of the openings 22 includes stiffening and/or supporting structure so that the edges may be referred to as structural body members.

Separate front and rear doors or side closure panels are provided for each access opening 22. The compartment front section 16 is entered and exited through either side of the body by a front hinged door 32 that closes the front portion of the access opening 22. The door 32 appears conventional but is modified to include upper and lower latches, 34, 36 adjacent the rear edge 38 of the door 32 and actuated by a single actuating handle 40. The latches engage strikers, not numbered, at the upper and lower edges of the access opening 22. The dual latches replace the usual single latch which engages a conventional center pillar (not used in this vehicle) or the front edge of an adjacent hinged rear access panel (also not used here). The arrangement allows the front door to be opened or remain closed independently of the position of the closure panel for the rear portion of the access opening 22. The rear edge of the door may be strengthened to stiffen the body opening when the door is closed to provide all or part of the strength of the omitted center pillar.

The compartment rear section 18 is entered and exited through an independent rear access panel or closure panel (IRAP) 44 on either side of the vehicle body 12. Panel 44 also includes front, rear, upper and lower edges 46, 48, 50, 52, as well as inner and outer sides 54, 56.

The closure panel 44 is solely supported for opening and closing motion by a four bar hinge assembly 60 made as a four bar linkage configured other than as a parallelogram. Hinge assembly 60 includes first and second load arms 62, 64, each pivotally connected in assembly at one end to the structure body member formed by the rear edge 26 of the associated access opening 22 and at another end to the inner side 54 of the panel 44. The connections could be to pivots forming part of the access opening rear edge 26 and the panel 44 structures. However, the illustrated embodiment includes a body bracket 66 and a panel bracket 68 mounted respectively to the opening rear edge 26 and the panel 44. If needed, additional brackets or support structure could be provided to assure rigid mounting of the brackets 66, 68 to the edge 26 and panel 44. The brackets are preferably connected first to the load arms to form the four bar assembly 60 which may be manufactured separately and shipped to an assembly point for mounting to the panel 44 and assembly of the panel and hinge assembly 60 to the rear edge 26 of the body access opening 22.

Figure 6:
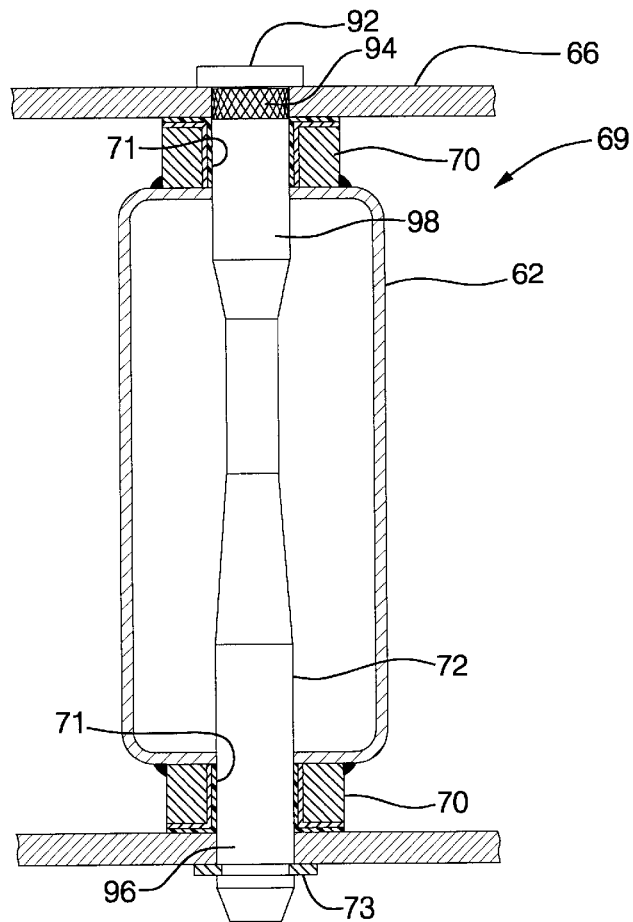
FIG. 6 is a cross-sectional view through a load arm of the linkage showing a pivot pin and bushings.
Figure 7:
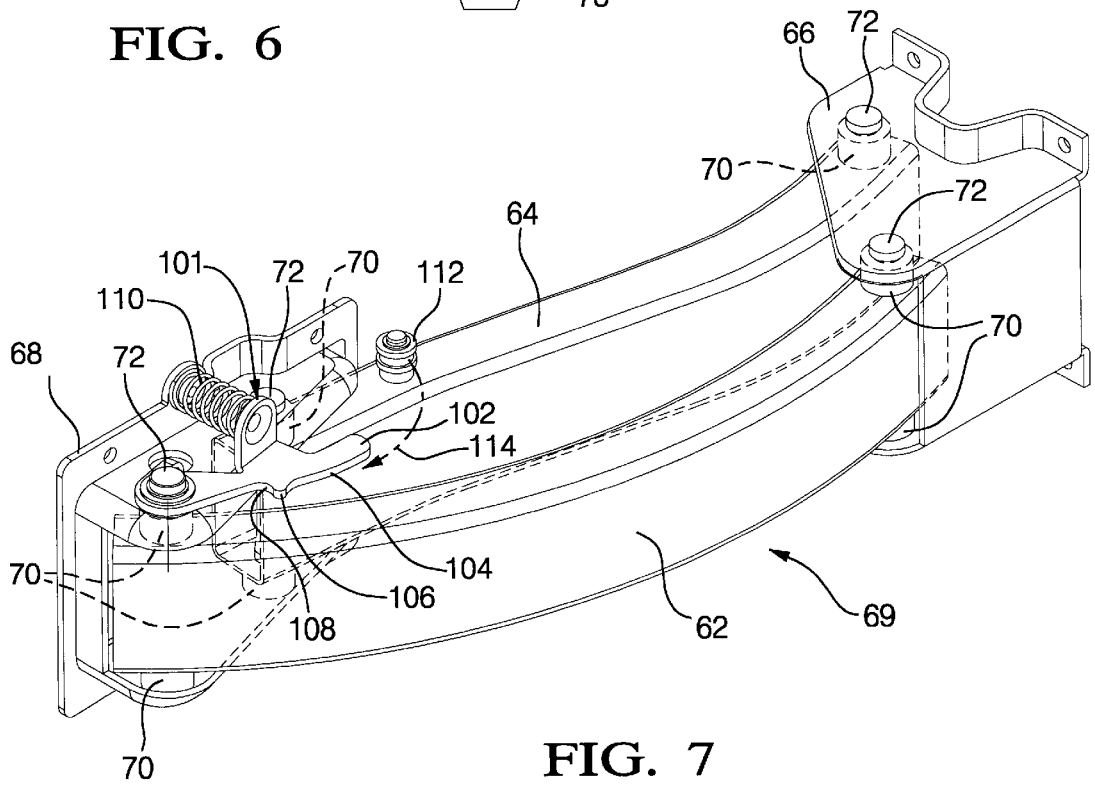
FIG. 7 is a pictorial view of a four bar linkage hinge assembly for a right side rear access panel showing the addition of a door hold-open to the hinge assembly.

FIGS. 6 and 7 show an exemplary embodiment of four bar hinge assembly 69. Hinge assembly 69 is made for use with a right hand side panel but is otherwise similar to assembly 60 wherein like numerals indicate like parts. The four bar hinge assemblies 60, 69 are each made with two tubular arms 62, 64 having vertically elongated cross sections and formed longitudinally with suitable curvatures for mounting and operation in the particular panel assembly for which they are intended. The arms are punched at upper and lower sides near their ends and external hinge bushings 70 are welded at the punched openings to form pivots. The bushings are accurately bored and steel backed PTFE bearing bushings 71 are inserted into the bores. The arms are assembled to the brackets by inserting hinge pins 72 that are pressed into the brackets 66, 68 and through the bushings 71. Retaining rings or clips 73 may be fixed to the bottoms of the pins to assure their retention in the bearing bores, if needed.

At the assembly point, the hinge assemblies 60, 69 may first be attached to the body 12 by bolting the body bracket 66 to the rear edge 26 of the access opening. The closure panel 44 may then be positioned in the specified closed position while the panel bracket 68 is bolted in position on the panel. The panel 44 and hinge assembly 60 or 69 are then assembled to the body by bolting the body bracket 66 to the structural body member forming the rear edge 26 of the access opening 22.

A feature of the invention is that the pivot points of the hinge assemblies 60, 69, the lengths of the arms 62, 64 and the longitudinal dimensions of the closure panel 44 are carefully positioned and selected to provide a unique opening motion for the panel, as is shown in FIGS. 5A–5F. Upon moving from the closed position (5A), the panel 44 moves rearward and away from the body in a swing path of major and minor arcs shown in FIG. 5F. During this motion, the panel rotates angularly while pivoting rearwardly such that the rear of the panel first moves outward (5B–C) to clear the rear edge 26 of the opening 22 while the front edge of the panel 44 rotates and moves longitudinally away from the rear edge 38 of the adjacent front door 32. Then the edges swing out (5C–E) as required by the arcs of the support arms and the panel pivots rearward to a fully open position (5F) primarily to the rear of the access opening 22 and generally parallel to the associated body side panel. The closing motion of the panel is the reverse of the opening motion.

The unique panel motion makes possible the coaction of the front edge 46 of the rear closure panel 44 with the rear edge 38 of the front door 32 to provide a sealed connection when body "doors" are closed. The rear edge 38 of the front door 32 is angled back with an extending outer flange 74 similar to a conventional door. The adjoining front edge 46 of the closure panel 44 is blunt with a recessed outer portion 76 that receives the flange 74 of the front door. An outer door seal 78 is located on the inside of flange 74 and an inner seal 80 is located on the front edge of the closure panel. An inner rear seal 82 is mounted along the inside of the rear edge 26 of the access opening 22. An outer peripheral seal is also provided. These seal positions provide for sealing of the front and rear door edges with a minimum of sliding or scrubbing motion of the door 32 and panel 44 against the seals. Additional seals, not shown, are provided for sealing the upper and lower edges of the closure panel.

The combination eliminates the need for a center pillar, or "B" pillar, between the front door 32 and the rear closure panel 44 and allows opening of either the door or the rear closure panel without regard to the position of the other. To provide for this and to hold the closure firmly in its closed position, the panel 44 is provided with three latches, a front upper latch 84, a front lower latch 86 and a rear edge latch 88. The front latches 84, 86 are located along upper and lower edges 50, 52 of the panel 44 to engage strikers, not shown, in the upper and lower edges 28, 30 of the access opening 22. The front edge 46 of the panel may be strengthened to provide some of the supporting strength of the missing center pillar when the panel 44 is closed. The rear edge latch is positioned to engage a rear striker, not shown, mounted midway of the rear edge 26 of access opening. Three latches are necessary, or at least desirable, because there are no edge mounted hinges on the panel 44 as in a conventional door. The three latches are preferably all actuated by a single actuating handle 90 positioned near the center of the closure panel 44.

FIG. 6 of the drawings shows additional details of the pivotal attachment of one of the load arms 62 with the body bracket 66, which is similar to that of the other pivot points.

Each hinge pin 72 includes a head 92 with an adjacent body portion 94 that may be knurled or expanded for pressing into an opening in the bracket 66. The distal end 96 of the pin carrying the clip 73 is preferably made slightly smaller than the bearing portion 98 adjacent the head, so that the upper bearing bushing 71 will not be damaged during installation of the pin. Other forms of pivot mounting and load arm configurations could also be used within the scope of the invention.

FIG. 7 of the drawings, wherein like numerals indicate like parts, shows an isometric pictorial view of the four bar hinge assembly 59 that illustrates the features of the four bar hinge assembly 60 as previously described, but is configured for use with a right side body access panel. The assembly 59 is shown in FIG. 7 in the panel closed position. Also shown is an additional feature of a panel hold open 100 including a detent arm 102 pivotally mounted on the forward hinge pin 72 of the panel bracket 68. Arm 102 extends generally toward the rear of the bracket and includes an outer cam surface 104 connecting with a raised detent point 106 and an adjacent holding recess 108. A spring 110 biases the arm 102 outward in the free state as shown. A hold open roller 112 is mounted on the load arm 64 in arcuate alignment with the cam as indicated by the arrow 114.

When the hinge assembly 60 is moved to the open position by pivoting the load arms clockwise, as viewed from above, about the hinge pins of the body bracket 66, the panel bracket 68 is moved rearward and outward. As the assembly 59 approaches the fully open position (not shown but similar to FIG. 5F) the roller 112 first engages the outer earn surface 104 of the detent arm 102. The roller rides along the cam and over the detent point 106 to the holding recess 108. The spring 110 biasing the arm recess out against the roller then holds the access panel in its open position. Exertion of sufficient force in the closing direction causes the roller to depress the detent arm and again release the panel for movement to the closed position.

While the closure panel embodiments described are especially suitable for use as a rear door adjoining a front door of a vehicle, similar panels and the four bar linkage hinge assemblies used therewith could be used in other vehicle and non vehicle applications where the advantages of the arrangement could be useful. For example, both side doors of a vehicle could be mounted on a four bar hinge assembly so they would open to parallel open positions. Alternatively, the concept could be applied to double rear doors on a truck or sport utility vehicle. One of the doors could be conventionally hinged and the other on a four bar hinge, or both doors could be independent rear access panels on four bar hinges.

As used herein, the terms four bar linkage, four bar hinge assembly, and the like refer to the classification of the four bar mechanism as having four bars connected together at their ends by four pivot points. In the present arrangement, the bars are the vehicle body or the body bracket, the access panel or its bracket, and the two load arms pivotally connected between the brackets. The linkage could include additional arms between the pivots, such as to increase the strength of the assembly, without changing its classification as a four bar linkage and without departing from the mechanisms intended to be covered by the appended claims.

While the invention has been described by reference to certain preferred embodiments, it should be understood that numerous changes could be made within the spirit and scope of the inventive concepts described. Accordingly, it is intended that the invention not be limited to the disclosed embodiments, but that it have the full scope permitted by the language of the following claims.

What is claimed is:

1. A vehicle body comprising:
   a structural body member defining at least one side edge of a user access opening in one side of the body;
   a closure panel for closing the access opening and openable for permitting user access to the vehicle, said panel having longitudinally opposite edges positioned in the closed position with one edge adjacent the structural body member and an opposite edge spaced longitudinally adjacent an opposite side edge of the opening; and
   a four bar linkage including a pair of load arms, each pivotally connected at one end to the structural body member and at another end to the closure panel intermediate said opposite edges;
   said linkage being configured for pivotally guiding the panel in a predetermined opening motion between a closed position closing the access opening and a fully open position longitudinally adjacent said one side edge of the opening and generally parallel with said side of the body; said motion including varying the angular orientation of the panel while pivoting the panel in a generally longitudinal direction such that said one edge of the panel first moves outward to clear the structural body member at said one side edge of the opening and said other edge of the panel first rotates and moves longitudinally away from said opposite side edge of the opening as the panel first pivots outward and then inward to said fully open position.

2. A vehicle body as in claim 1 wherein said panel is solely supported by said linkage during opening and closing movements between the closed and open positions.

3. A vehicle body as in claim 1 wherein said linkage includes at least four pivot pins connecting said arms with spaced panel mounted pivots and spaced body mounted pivots.

4. A vehicle body as in claim 3 wherein said linkage includes a first bracket carrying the panel mounted pivots and mounted on an inner portion of the panel and a second bracket carrying the body mounted pivots and mounted on said structural body member, whereby said linkage may be formed as a subassembly that is subsequently attached to the panel and to said structural body member to mount the panel on the vehicle body.

5. A vehicle body as in claim 1 wherein said opposite edge of the closure panel has an inner portion that protrudes longitudinally beyond an outer surface of the panel to mate with adjacent body structure having a protruding outer surface adjacent a longitudinally recessed inner portion.

6. A vehicle body as in claim 5 wherein said adjacent body structure comprises a pivotable side door including said outer surface and longitudinally recessed inner portion adjacent said other edge of the closure panel in its closed position, and said opening motion of the panel moves said protruding inner portion of the other edge longitudinally out from behind said protruding outer surface of the side door prior to pivoting said other edge laterally outward and longitudinally away from the side door.

7. A vehicle body as in claim 6 wherein said door is a front door hinged at its forward edge and said closure panel opens toward the rear of the vehicle body.

8. A vehicle body as in claim 7 wherein said body access opening receives both said closure panel and said side door in adjacent closed positions without an intermediate support pillar of the body.

9. A vehicle body as in claim 8 wherein said door and said closure panel when closed are latched to the body at upper and lower edges of the access opening.

10. A vehicle body as in claim 7 wherein said linkage arms comprise inner and outer arms and the pivots connected to the structural body member are spaced apart a greater distance laterally than are the pivots connected to the closure panel.

11. A vehicle body as in claim 10 wherein the pivots connected to the structural body member are spaced apart a greater distance laterally than longitudinally and the pivots connected to the closure panel are spaced apart a greater distance longitudinally than laterally.

12. A vehicle body as in claim 4 including a panel hold open device pivotally mounted to one of said brackets.

* * * * *